(12) United States Patent
 Kalaboukis et al.

(10) Patent No.: US 8,892,606 B2
(45) Date of Patent: Nov. 18, 2014

(54) METHOD AND SYSTEM FOR MEDIA COLLECTION EXPANSION

(75) Inventors: Chris Kalaboukis, Los Gatos, CA (US); Roberto Fisher, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 745 days.

(21) Appl. No.: 11/944,443

(22) Filed: Nov. 22, 2007

(65) Prior Publication Data
 US 2009/0138502 A1 May 28, 2009

(51) Int. Cl.
 *G06F 7/00* (2006.01)
 *G06F 17/30* (2006.01)

(52) U.S. Cl.
 CPC .... *G06F 17/30035* (2013.01); *G06F 17/30038* (2013.01)
 USPC .......................................... 707/802; 707/732

(58) Field of Classification Search
 None
 See application file for complete search history.

(56) References Cited

U.S. PATENT DOCUMENTS

| | | | | |
|---|---|---|---|---|
| 7,284,033 B2* | 10/2007 | Jhanji | ........................... | 709/206 |
| 7,534,169 B2* | 5/2009 | Amaitis et al. | .................. | 463/39 |
| 7,792,756 B2* | 9/2010 | Plastina et al. | .................. | 705/51 |
| 2003/0182315 A1* | 9/2003 | Plastina et al. | ................ | 707/200 |
| 2004/0128210 A1* | 7/2004 | Gabos et al. | ..................... | 705/26 |
| 2005/0251820 A1* | 11/2005 | Stefanik et al. | ................. | 725/34 |
| 2006/0095792 A1* | 5/2006 | Hurtado et al. | ............... | 713/189 |
| 2006/0195403 A1* | 8/2006 | New et al. | ........................ | 705/59 |
| 2008/0092159 A1* | 4/2008 | Dmitriev et al. | ................ | 725/34 |
| 2008/0189617 A1* | 8/2008 | Covell et al. | ................... | 715/738 |
| 2009/0144154 A1* | 6/2009 | Schein | ............................ | 705/14 |
| 2013/0012324 A1* | 1/2013 | Amaitis et al. | .................. | 463/43 |

OTHER PUBLICATIONS

TiVo Setup & Support—What Are Tivo Suggestions? [online]. Tivo Inc. © 1998-2007 [retrieved online on Nov. 26, 2007] Retrieved from the internet: <http://tivosupport2.instancy.com/LaunchContent.aspx?CID=9350c8ec-393f-4d9b-8a45-d50b6d0fb2e3>.
Y! Music Your Recommendations—Yahoo! Music [online]. Yahoo! © 2007 [retrieved online on Nov. 26, 2007] Retrieved from the internet: <http://help.yahoo.com/l/us/yahoo/music/music/recommendations/recommend01.html>.

* cited by examiner

*Primary Examiner* — Tarek Chbouki
(74) *Attorney, Agent, or Firm* — Berkeley Law & Technology Group, LLP

(57) ABSTRACT

Systems and methods have been developed for expanding collections of media objects that are stored remotely. More specifically, systems and methods have been developed for continuously monitoring and updating collections of media objects stored in a user's media repository (e.g., a "media locker").

22 Claims, 3 Drawing Sheets

METHOD AND SYSTEM FOR MEDIA COLLECTION EXPANSION

BACKGROUND

Increasingly the Internet and other networks (e.g., wired and wireless networks) are utilized to transmit content in the form of media objects (e.g., video, audio, etc.) between users and content providers or distributors. Users may consume (e.g., watch, listen to, etc.) or otherwise utilize this content in various locations and with various media applications (e.g., client devices). In some cases, users may store collections of content remotely that is accessible via a network (e.g., the Internet).

SUMMARY

Systems and methods have been developed for expanding collections of media objects that are stored remotely. More specifically, systems and methods have been developed for continuously monitoring and updating collections of media objects stored in a user's media repository (e.g., a "media locker").

In one embodiment (which embodiment is meant to be illustrative and not restrictive), a method for media collection expansion is provided. The method includes identifying at least one media object accessible within a user media repository. The method further includes compiling consumption data that corresponds to usage, by a user, of the at least one media object. The method yet further includes generating user profile data based upon at least one of the identification of the at least one media object and the consumption data. The method still further includes identifying at least one promotional media object that corresponds to the user profile data and that is not within the user media repository. The method further includes permitting access to the at least one promotional media object within the user media repository.

In one aspect of the method, the step of permitting access to the at least one promotional media object within the user media repository includes delivering the at least one promotional media object to the user media repository. In another aspect of the method, the step of permitting access to the at least one promotional media object within the user media repository includes delivering only a portion of the at least one promotional media object to the user media repository. In yet another aspect of the method, the portion of the at least one promotional media object comprises a beginning portion. In still another aspect of the method, the step of permitting access to the at least one promotional media object within the user media repository includes delivering, to the user media repository, a URI for accessing the at least one promotional media object. In another aspect of the method, the step of permitting access to the at least one promotional media object within the user media repository includes delivering, to the user media repository, a license to access the at least one promotional media object. In yet another aspect of the method, the step of identifying at least one media object accessible within a user media repository includes identifying metadata associated with the at least one media object. In still another aspect of the method, the metadata comprises a name, title, track, album, or genre. In another aspect of the method, the step of compiling consumption data that corresponds to usage, by a user, of the at least one media object includes identifying temporal or spatial data associated with the usage of the at least one media object. In yet another aspect of the method, the step of compiling consumption data that corresponds to usage, by a user, of the at least one media object includes identifying an event associated with the usage of the at least one media object. In still another aspect of the method, the event is a playback event. In another aspect of the method, the step of identifying at least one promotional media object that corresponds to the user profile data and that is not within the user media repository includes searching a network for the at least one promotional media object. In yet another aspect of the method, the network is the Internet. In still another aspect of the method, the steps of identifying at least one media object accessible within a user media repository; compiling consumption data that corresponds to usage, by a user, of the at least one media object; generating user profile data based upon at least one of the identification of the at least one media object and the consumption data; identifying at least one promotional media object that corresponds to the user profile data and that is not within the user media repository; and permitting access to the at least one promotional media object within the user media repository are performed at a client. In another aspect, the method includes receiving compensation from the user or a third party for performing the step of identifying at least one promotional media object that corresponds to the user profile data and that is not within the user media repository and the step of permitting access to the at least one promotional media object within the user media repository. In yet another aspect of the method, the compensation is non-monetary. In still another aspect, the method includes monitoring the media object repository and the usage of the at least one media object by the user. In another aspect, the method includes detecting a change in at least one of the user media repository or the usage by the user. In yet another aspect, the method includes updating the user profile data based upon the change detected in the step of detecting a change in at least one of the user media repository or the usage by the user. In still another aspect of the method, detecting the change in the user media repository includes detecting the addition or subtraction of a media object from the user media repository. In another aspect of the method, detecting the change in the user media repository includes detecting a change in metadata that is stored with the at least one media object within the user media repository. In yet another aspect of the method, the change is detected in both the user media repository and the usage by the user. In still another aspect of the method, the generation of the user profile data is based upon both the identification of the at least one media object and the consumption data.

In one embodiment (which embodiment is meant to be illustrative and not restrictive), a computer readable medium encoding or containing computer executable instructions for performing a method is provided. The method includes identifying at least one media object accessible within a user media repository. The method further includes compiling consumption data that corresponds to usage, by a user, of the at least one media object. The method yet further includes generating user profile data based upon at least one of the identification of the at least one media object and the consumption data. The method still further includes identifying at least one promotional media object that corresponds to the user profile data and that is not within the user media repository. The method further includes permitting access to the at least one promotional media object within the user media repository.

In one embodiment (which embodiment is meant to be illustrative and not restrictive), a system for media collection expansion is provided. The system includes a processor configured to identify a collection of media objects accessible to a user media repository, compile consumption data corresponding to usage, by a user, of at least one media object of the collection, and generate user profile data based upon the identification and the compilation. The system further includes a user preference repository that stores the user profile data. The system yet further includes a communications module configured to communicate with a network to identify at least one media object that corresponds to the user profile data and that is not part of the collection of media objects and make accessible, to the user media repository, the at least one media object that corresponds to the user profile data.

These and various other features as well as advantages will be apparent from a reading of the following detailed description and a review of the associated drawings. Additional features are set forth in the description which follows, and in part will be apparent from the description, or may be learned by practice of the described embodiments. While it is to be understood that both the foregoing general description and the following detailed description are exemplary and explanatory, the benefits and features will be realized and attained by the structure particularly pointed out in the written description and claims hereof as well as the appended drawings.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
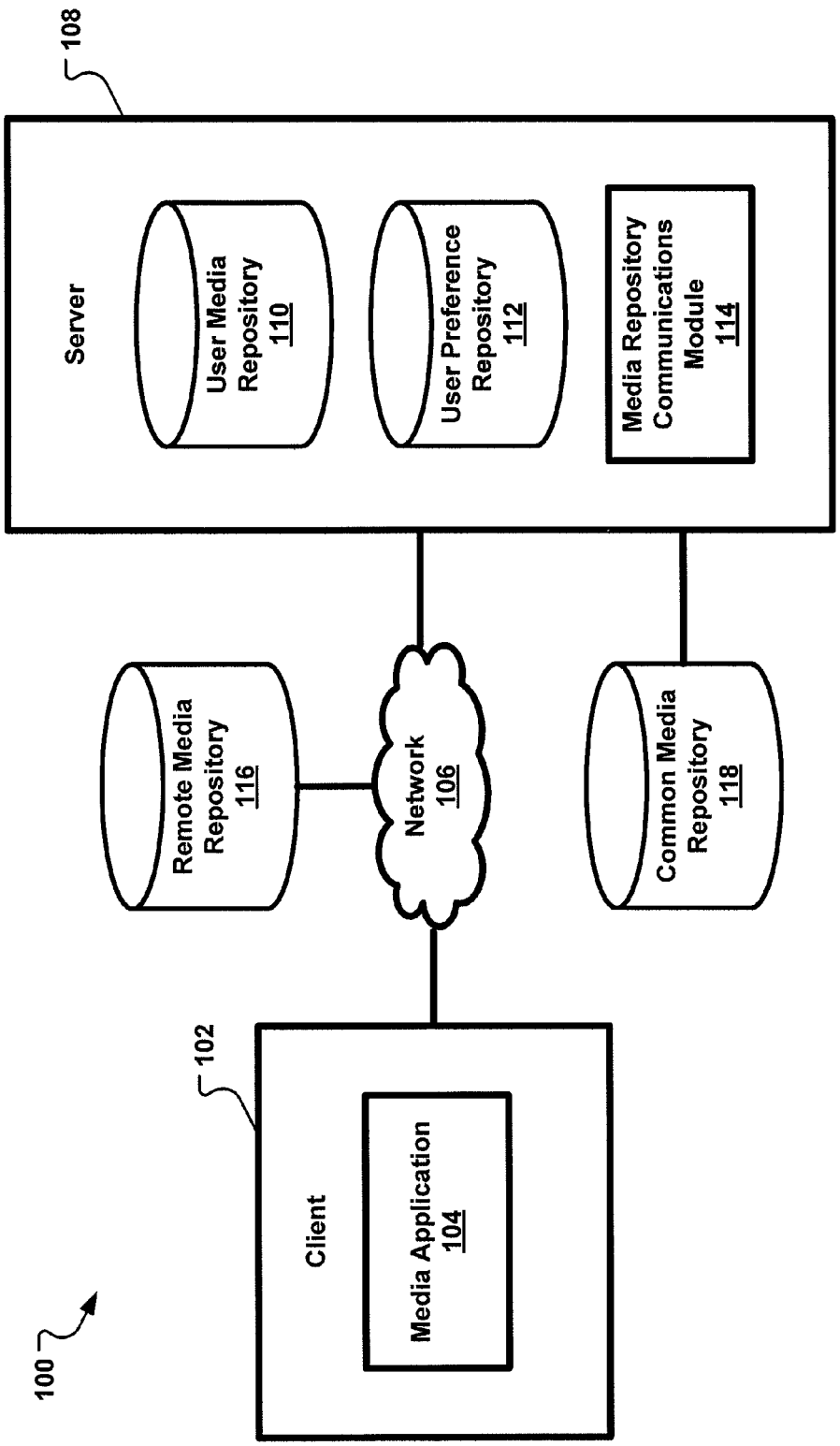
FIG. 1 illustrates an embodiment of a system for expanding a collection of media objects.

The following detailed description is intended to convey a thorough understanding of the embodiments described by providing a number of specific embodiments and details involving systems and methods for expanding a collection of media objects. It should be appreciated, however, that the claims appended hereto are not limited to these specific embodiments and details, which are exemplary only. It is further understood that one possessing ordinary skill in the art, in light of known systems and methods, would appreciate the applicability of this disclosure for its intended purposes and benefits in any number of alternative embodiments, depending upon specific design and other needs.

As set forth in this disclosure, including the claims and figures appended hereto, the term media object refers to an individual item of media having characteristics that can be objectively analyzed. One skilled in the art will recognize that a media object may take many forms. For example, a media object may be comprised of audio, video, imagery, text, or other data in the form of electronic files. Typically, a media object may be consumed (i.e., played, displayed or rendered) in a variety of ways. For example, a media object may be comprised of an audio file (e.g., an MP3 audio file) that may be consumed (e.g., played) using audio playback hardware and/or software. Similarly, a media object comprised of a compressed video file may be consumed (e.g., decompressed and played) using a hardware and/or software video decoder and playback engine. Depending on the embodiment, a media object may be delivered (e.g., streamed or otherwise transmitted to an application, device, etc.) for consumption, for example, at a rendering device. In some cases, media objects may be encapsulated within other media objects. For example, a media object comprising a portion of text (e.g., a movie title) may be embedded within another media object (e.g., a streaming MPEG-2 video file). As yet another example, media objects stored within a user media repository may be comprised of addresses, licenses and/or references that permit access to and/or use of media objects stored remotely or at another location (e.g., a connected storage device). One skilled in the art will recognize that media objects may take many forms that are within the scope of this disclosure.

As further set forth in this disclosure, including the claims and figures appended hereto, the term format is used interchangeably to refer to the format of the media object container or data structure (e.g., a file format such as a .jpeg, .mp3, or .avi file) or the format of the content that is embodied within the media object (e.g., video content in a high-definition format that is down converted to a lower resolution format, or a color picture formatted as a black-and-white picture, or video content that is transformed from a video format into an audio format). Thus, changing the format of a media object may include, but is not limited to, modifying or otherwise manipulating a media object file or the content contained within a media object file.

Additionally, as further set forth in this disclosure, including the claims and figures appended hereto, consumption of media objects may take place on a variety of computing devices and/or media applications (i.e., software). For example, computing devices may include, but are not limited to, personal computers, mobile computers (i.e., laptops or mobile phones), televisions, set-top-boxes, and personal digital assistants. Typically, computing devices will include a processor and memory for storing data and software. Computing devices may include operating system software that allow execution of software programs and manipulation of data. As set forth herein, computing devices may communicate using many types of networks, including but not limited to wired and wireless data connections (e.g., computing devices may interconnect via wired connections to the Internet). One skilled in the art will recognize that computing devices and networks may take many forms that are within the scope of this disclosure.

FIG. 1 illustrates an embodiment of a system 100 for expanding a collection of media objects. The system 100 is a computing architecture that comprises a client 102 computing device and server 108 computing device that are connected via a network 106. The client 102 may be comprised of a variety of computing devices, including, but not limited to, personal computers, personal digital assistants, telephones, wireless devices, gaming systems, and other devices. For example, the client 102 may be comprised of a personal computer that includes a processor and memory, upon which software may be executed. In an embodiment, a media application 104 comprising instructions may be executed on a processor of the client 102. A media application 104 may itself be comprised of instructions and other data in the form of software for execution on the client device 102. For example, a media application 104 may be comprised of one or more programs, such as a web browser, a media playback application, and other software for consuming media objects. One skilled in the art will recognize that many types of media applications 104 may exist that are within the scope of this disclosure. The client 102 computing device may be connected to the server 108 via a network 106, such as the internet. A network may be comprised of one or more computing device (e.g., servers and other computing devices) that are interconnected wirelessly or in wired configurations. One skilled in the art will recognize that many types of networks that exist that are within the scope of this disclosure.

Typically, a network 106 is comprised of computers and associated devices that are connected by communications facilities. A network 106 may involve permanent connections, such as cables or temporary connections made through telephone or other communications links. A network 106 may be as small as a local area network (LAN) and may be comprised of a few computers, printers, and/or other devices, or it may also be comprised of small and large computers distributed over a vast geographic area (e.g., a wide-area network (WAN)). A server 108 may be comprised of one or more computers that are interconnected to one or more client 102 devices via a network 106. A server 108 may be comprised of one or more computers and/or programs that respond to commands from a client 102. Typically, for example, a file server may contain an archive of data or program files. When a client 102 submits a request for a file, the server 108 may transfer a copy of the file to the client 102. A server 108 may include or be connected to one or more hard disks and/or other storage devices. One skilled in the art will recognize that a server 108 may also be comprised of computing devices that may not include certain storage devices. Typically, a server 108 may serve (e.g., stream and/or otherwise deliver) files to a client 102 via a network 106. In one embodiment, a client 102 and/or server 108 may communicate with computing devices (e.g., computing devices including communications modules) using various application layer network protocols, including but not limited to the hypertext transfer protocol ("HTTP") and the file transfer protocol ("FTP"). One skilled in the art will recognize that a client 102 and/or server 108 may utilize many other type of network protocols, including but not limited to the transmission control protocol ("TCP") and Internet Protocol ("IP"). HTTP is commonly used by a browser program 104 as a communications protocol to access network resources such as Uniform Resource Identifiers ("URI"). URIs may be comprised of a compact string of characters used to identify or name a resource and typically enable interaction with representations of the resource over a network, typically the Internet. A URI may be classified as a locator or a name or both. A Uniform Resource Locator ("URL") is a URI that, in addition to identifying a resource, typically describing its primary access mechanism (e.g., using the schema "ftp://" a URL may indicate a network resource accessible by the FTP network protocol) or network location. Similarly, a Uniform Resource Name (URN) is a URI that identifies a resource by name in a particular namespace (i.e., a collection of names or identifiers where the names or identifiers of the collection are unique). The combination of HTTP and URI protocols may be used to permit media application 104 to access, render, and interact with a media objects (e.g., media objects referenced by an address, for instance, that may be set forth on a web page).

Files and other media objects may reside within a user media repository 110. A user media repository 110 may itself be comprised of one or more computing devices for recording computer data in permanent, semi-permanent, or temporary form. For example, a user media repository 110 may be comprised of random access memory, read-only memory, and other types of memory. Alternatively, or in addition, a server 108 may also be comprised of various types of physical storage media. For example, a user media repository 110 may be comprised of devices such as hard disks, tape and optical disks, and/or other types of physical storage media on which data bits are written and stored.

In one embodiment, a user preference repository module 112 is provided for storing user profile data. For example, user profile data may include, but is not limited to, consumption data that corresponds to usage (e.g., playback, display, etc.) of media objects within the user media repository 110. As another example, user profile data may include, but is not limited to, spatial or temporal data. Further to this example, spatial data may include data identifying the usage of media objects related to a certain geographic region (e.g., use of a media object in a certain city) or related to movement through space (e.g., use of a media object while driving). As another example, temporal data may include data identifying or pertaining to usage of media objects related to time. Temporal data thus may include clock time (e.g., expressed in hours, minutes, or seconds), calendar time (e.g., expressed in days, weeks, months, or years), and event time (e.g., expressed in relation to an event, such as use of a media object during work or in response to some stimulus). The user preference repository module 112 may also store user profile data in the form of metadata or other information that is associated with media objects stored in the user media repository 110. For example, metadata of media objects may include, for audio and video media objects, title, genre, and playback duration information.

In one embodiment, a server 108 may further comprise a media repository communications module 114. The media repository communications module 114 may itself be comprised of hardware and/or software for delivering the media object to a client 102 and/or receiving instructions from the client 102 or another computing device for manipulating the media object within the server 108. For example, as discussed below, a media repository communications module 114 may include, but is not limited to including, one or more servers that may be distributed or that may operate in parallel.

In an embodiment, the system 100 further includes a remote media repository 116 and common media repository 118. A remote media repository 116 may be comprised of one or more remote computing devices, including but not limited to servers and storage devices, that remotely store media objects that may be accessible to, or be made accessible to, a user media repository 110. For example, a remote media repository 116 may include computing devices storing media objects that are accessible via a network such as the Internet. A common media repository 118 may be comprised of one or more computing devices, that may or may not be remote to server 108, including but not limited to servers and storage devices, that store media objects that may be accessible to, or be made accessible to, a user media repository 110. For example, a common media repository 118 may include media objects that may be accessed by a plurality of users (e.g., users subscribing to a service that provides them with access to a user media repository 110).

In one embodiment of system 100, a media application 104 of a client 102 communicates via network 106 to the server 108. The media application 104 may request a media object stored within a user's media repository 110. The media object within the user media repository 110 may be consumed in a variety of ways. For example, a user may download, stream or otherwise access or manipulate a media object. The media object may be consumed by the media application 104 by a user viewing or otherwise using media application 104. One skilled in the art will recognize that many forms of consumption are within the scope of this disclosure, including, but not limited to, playback of media objects that may be played, display of media objects that may be displayed, and/or rendering of media objects that may be rendered. For example, a media object that comprises a video file may be played back by a media application 104, such as Windows Media Player or other software designed for playing back media objects in the form of video. As another example, a media object in the form of a compressed audio file may be rendered by software that interprets instructions encoded using an MP3 codec. User profile data may be generated based upon the consumption of media objects and/or the media objects residing within or accessible to a user media repository 110. A user preference repository 112 may store the user profile data, and may update such data as changes occur in the user media repository 110 (e.g., addition or deletion of media objects) or consumption of media objects occurs.

Figure 2:
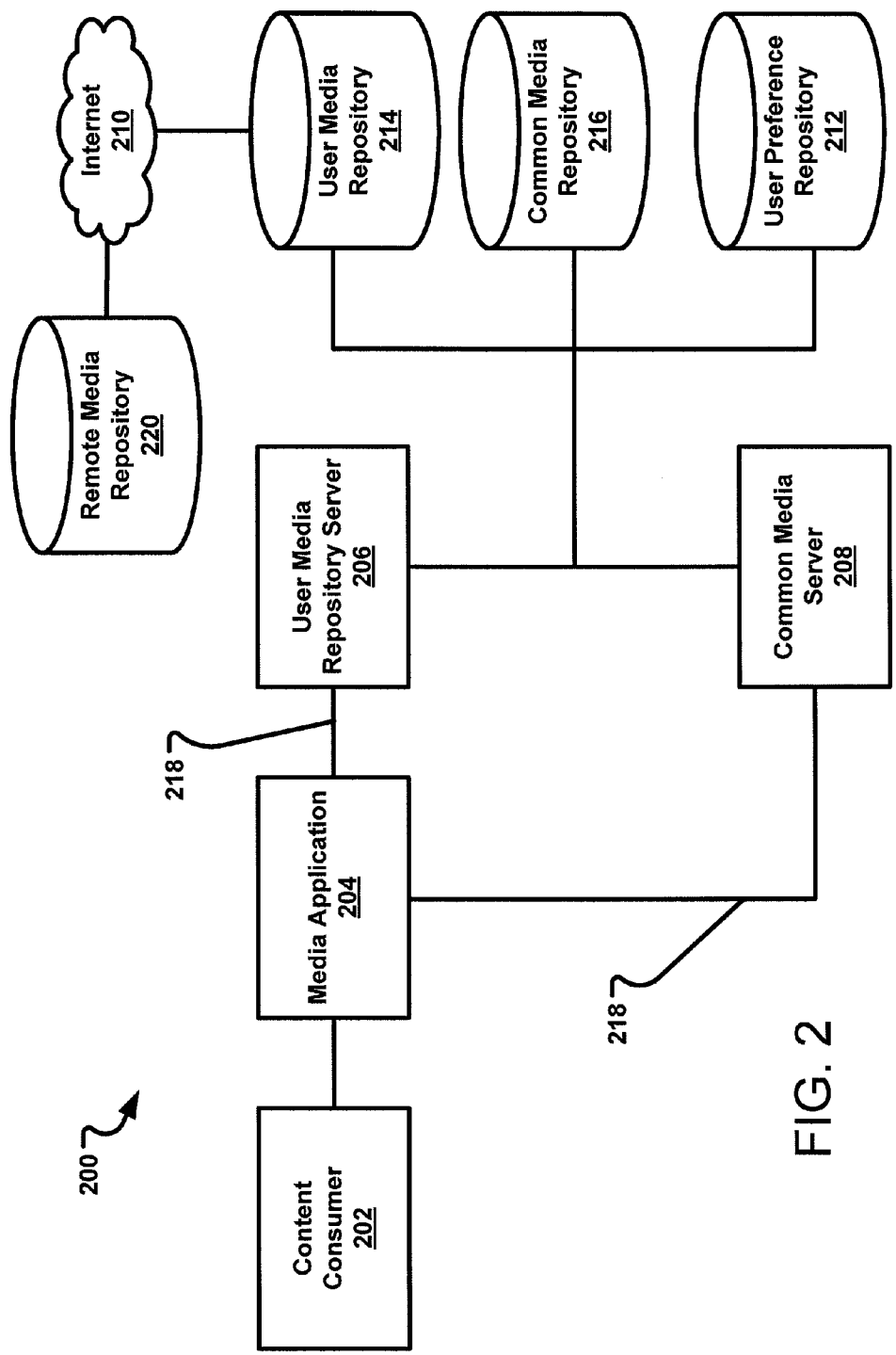
FIG. 2 illustrates another embodiment of another system for expanding a collection of media objects.

FIG. 2 illustrates another embodiment of a system 200 for expanding a collection of media objects. The system 200 is computing architecture for expanding a collection of media objects. In the system 200, a content consumer 202 (i.e., a user) requests, using a media application 204, a media object from the user's media repository 214. The request is received from the media application 204 by a user media repository server 206 via an internet, intranet, or other network connection 218. In one embodiment, the user media repository server 206 receives the request from media application 204 and communicates that request to a common media server 208. The common media server 208 may then determine whether the media object that is requested resides in the user's media repository 214, whether the media object additionally, or in the alternative, resides on or is connected to a network, such as Internet 210, or whether the media object resides at some other location (e.g., remote media repository 220). In one embodiment, a common media server 208 that is unable to locate a media object within the media repository 214 may determine whether the media object resides in a common media repository 216. A common media repository 216 may be comprised of one or more storage devices for storing media objects that are accessible to, but not yet part of the content consumer's 202 or user's media repository 214. In an embodiment, a user preference repository 212 may store use profile data that is generated on the basis of consumption of media objects and/or identification of media objects within or accessible to a user media repository 214.

Figure 3:
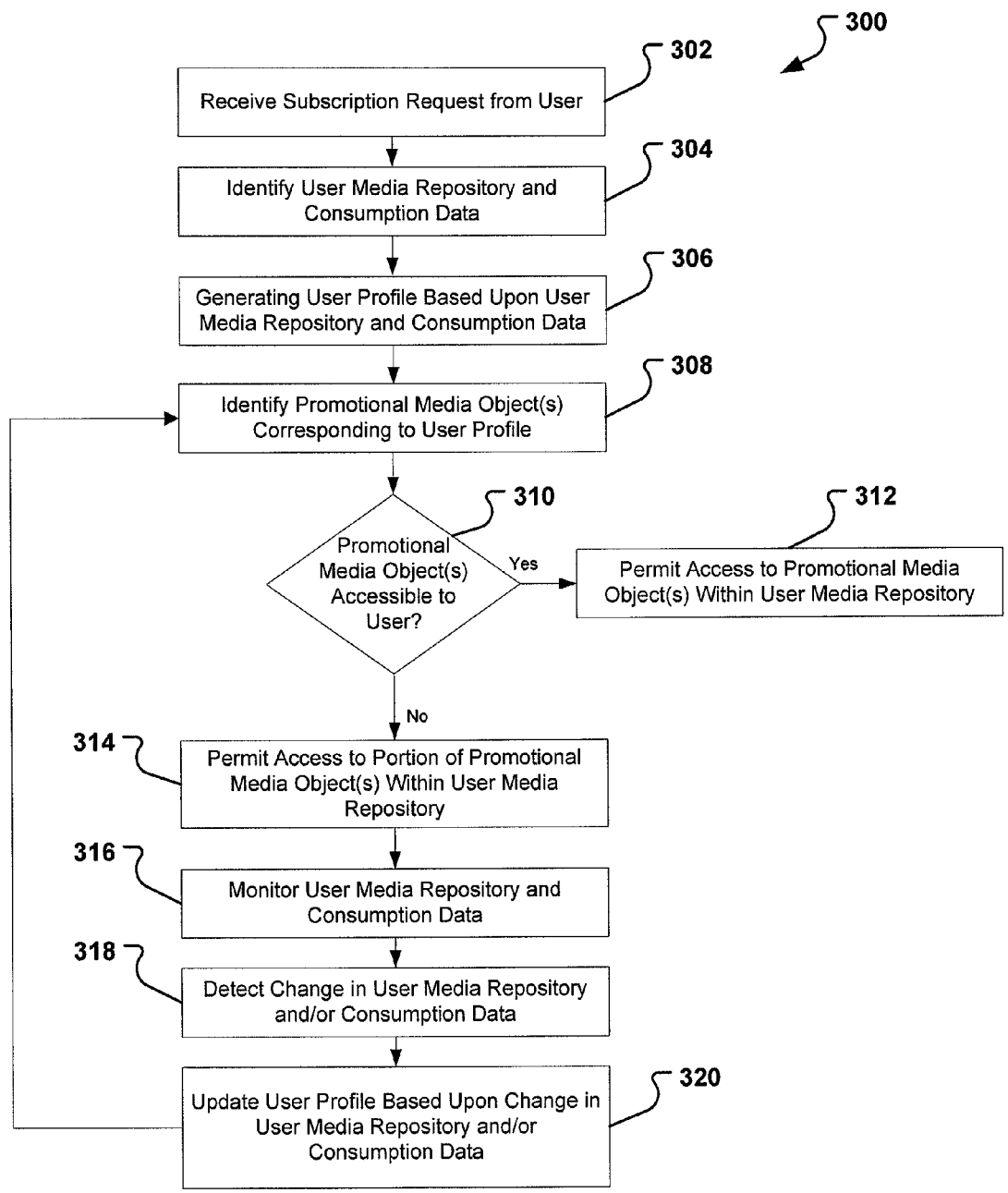
FIG. 3 illustrates an embodiment of a method for expanding a collection of media objects.

FIG. 3 illustrates an embodiment of a method 300 for expanding a collection of media objects. In the method 300, a subscription request 302 is received from a user. The subscription request may request that the user media repository 110, 214 be scanned 304 to determine media objects that may be recommended or otherwise made part of or accessible to the user media repository 110, 214. Scanning 304 of the user media repository 110, 214 may identify media object(s) (e.g., metadata associated with media objects) and/or consumption data that describes how media objects within or accessible to the user media repository 110, 214 were consumed by a user. In an embodiment, a user profile may be generated 306 based upon media objects stored or accessible to the user media repository 110, 214 and/or consumption data corresponding to the usage, by a user, of the media objects within the user media repository 110, 214. The user profile data may then permit identification 308 of promotional media objects that may be made accessible to or placed within the user media repository 110, 214. As used in this disclosure, including the claims and figures appended hereto, promotional media objects means media objects that are not already part of a user media repository 110, 214. In one embodiment, if the promotional media objects are accessible 310 to a user (e.g., may be accessed pursuant to a user's subscription or pursuant to a financial transaction), access to the promotional media objects may be permitted 312 within the user's media repository 110, 214. Alternatively, a portion of the promotional media objects (e.g., a 30-second clip of video) may be made accessible to the user media repository 110, 214. A user media repository 110, 214 may be monitored 316 and detect 318 or otherwise identify new or changing consumption data or media objects accessible to or stored within the user media repository 110, 214. For example, media objects that are removed or added to a user media repository 110, 214 may form the basis for generating user profile data that identifies additional or different promotional media objects that may be made accessible to the user. Use profile data may then be updated 320 in response to detecting changes in the media objects stored within or accessible to a user media repository 110, 214 and/or new or changing consumption data generated by a user's usage of the media objects within the user media repository 110, 214.

As a further illustration of the method 300, a user may store media objects within the user's media repository (i.e., the user's media locker). The user may request 302 that promotional media objects be included within their user media repository. The request, or later permitting access to promotional media objects, may involve receiving compensation (e.g., monetary or non-monetary) from the user or a third party (e.g., a promoter of the promotional media objects). In response to the request, a scan of the user's media repository may identify 304 media objects sharing a common artist or genre of music (e.g., in the case of media objects in the form of music files). The common artist or genre of music may be analyzed or otherwise evaluated to generate 306 a user profile for purposes of identifying 308 promotional media objects (e.g., media objects appealing to users who consume media objects of a certain genre or common artist) corresponding to the user profile. For example, if a user regularly consumes media objects in the form of classical music files, the genre (e.g., classical music) may identify a promotional media object in the form of an instrumental music file or operatic video file. If the promotional media objects are accessible 310 to the user, the user may be permitted 312 to access the promotional media objects within the user's media repository. If the promotional media objects are inaccessible to the user, the user may be permitted access 314 to portions (e.g., clips) of the promotional media objects. Further monitoring 316 of the user's media repository may detect 318 changing consumption patterns or changes in media objects accessible to or residing within the user media repository. The user's profile data may then be updated to reflect these changes.

In other embodiments, one or more of the above referenced methods may comprise a computer readable medium encoding or containing computer executable instructions for performing a method for displaying a web page element. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of this disclosure. For example, the consumptive behavior of users sharing common attributes (e.g., users with media objects by the same artist or director within or accessible to their individual user media repositories) may be evaluated to identify promotional media objects. Numerous other changes may be made which will readily suggest themselves to those skilled in the art and which are encompassed in the spirit of this disclosure and as defined in the appended claims.

What is claimed is:

1. A method comprising:
   identifying, via a computing device, at least one media object accessible within a user media repository, the user media repository being associated with a computer-readable storage medium and located on a network, the user media repository comprising one or more media objects accessible by an individual user;
   compiling, via the computing device, consumption data that corresponds to usage, by a user, of the at least one media object;
   generating, via the computing device, user profile data based upon at least in part on the identification of the at least one media object and the consumption data;
   updating the user profile date based at least in part on a detected change in the user media repository and on a detected change in usage of the at least one media object related to user movement through geographic space;
   identifying, via the computing device, at least one promotional media object based on the user profile data, the user profile data to specify one or more characteristics of one or more media objects currently stored within the user media repository, the at least one promotional media object not within the user media repository; and
   permitting, via the computing device, access to the at least one promotional media object.

2. The method of claim 1, wherein the permitting, via the computer device, access by the user to the at least one promotional media object comprises delivering the at least one promotional media object to the user media repository.

3. The method of claim 1, wherein the permitting, via the computing device, access by the user to at least one promotional media object comprises delivering only a portion of the at least one promotional media object to the user media repository.

4. The method of claim 3, wherein the portion of the at least one promotional media object comprises a beginning portion.

5. The method of claim 1, wherein the permitting, via the computing device, access by the user to at least one promotional media object comprises delivering, to the user media repository, a URI for accessing the at least one promotional media object.

6. The method of claim 1, wherein the permitting, via the computing device, access by the user to the at least one promotional media object comprises delivering, to the user media repository, a license to access the at least one promotional media object.

7. The method of claim 1, wherein the identifying, via a computing device, the at least one media object accessible within the user media repository comprises identifying metadata associated with the at least one media object.

8. The method of claim 7, wherein the metadata comprises a name, title, track, album, or genre.

9. The method of claim 1, wherein the compiling comprises:
   identifying temporal or spatial data associated with the usage of the at least one media object, the spatial data comprising the indication of geographic area related to user consumption of the at least one media object.

10. The method of claim 1, wherein the compiling comprises:
    identifying an event associated with the usage of the at least one media object.

11. The method of claim 10, wherein the event comprises a playback event.

12. The method of claim 1, wherein identifying, via the computing device, at least one promotional media object based on the user profile data comprises:
    searching a network for the at least one promotional media object.

13. The method of claim 12, wherein the network comprises the Internet.

14. The method of claim 1 wherein, the identifying, via a computing device, at least one media object accessible within a user media repository, the compiling, the generating, the identifying, via the computing device, at least one promotional media object based on the user profile data, and the permitting, via the computing device, access by the user to the at least one promotional media object are performed at a client.

15. The method of claim 1, further comprising:
    receiving compensation from the user or a third party for performing the identifying, via the computing device, at least one promotional media object based on the user profile data, and the permitting, via the computing device, access by the user to the at least one promotional media object.

16. The method of claim 15, wherein the compensation is nonmonetary.

17. The method of claim 1, wherein the detected change in the user media repository comprises an addition or subtraction of a media object from the user media repository.

18. The method of claim 1, wherein the detected change in the user media repository comprises a change in metadata that is stored with the at least one media object within the user media repository.

19. The method of claim 1, wherein the detected change is detected in both the user media repository and the usage by the user.

20. The method of claim 1, wherein the generation of the user profile data is based upon both the identification of the at least one media object and the consumption data.

21. An article, comprising: a non-transitory storage medium having stored thereon instructions executable by a computing device to:
- identify at least one media object accessible within a user media repository located on a network, the user media repository comprising one or more media objects accessible by an individual user;
- compile consumption data that corresponds to usage, by a user, by the individual user, of the at least one media object;
- generate user profile data based upon at least one of the identification of the at least one media object and the consumption data comprising an indication of geographic area related to user consumption of the at least one media object;
- update the user profile data based at least in part on a detected change in the user media repository and on a detected change in usage of the at least one media object related to user movement through geographic space;
- identify at least one promotional media object based on the user profile data, the user profile data to specify one or more characteristics of one or more media objects currently stored within the user media repository, the at least one promotional media not within the user media repository; and
- permit access by the individual user to the at least one promotional media object.

22. An apparatus, comprising:
- means for identifying at least one media object accessible within a user media repository, the user media repository being associated with a computer-readable storage medium and located on a network, the user media repository comprising one or more media objects accessible by an individual user;
- means for compiling, via the computing device, consumption data that corresponds to usage, by the individual user, of the at least one media object;
- means for generating, via the computing device, user profile data based at least in part on the identification of the at least one media object and the consumption data;
- means for updating the user profile data based at least in part on a detected change in the user media repository and on a detected change in usage of the at least one media object related to user movement through geographic space;
- means for identifying, via the computing device, at least one promotional media object based on the user profile data, the user profile data to specify one or more characteristics of one or more media objects currently stored within the user media repository, the at least one promotional media object not within the user media repository; and
- means for permitting, via the computing device, access by the user to the at least one promotional media object.

* * * * *